W. B. THOMPSON.
COMBINED TIRE PROTECTOR AND GUARD.
APPLICATION FILED JULY 11, 1914.
1,145,394.
Patented July 6, 1915.
2 SHEETS—SHEET 2.
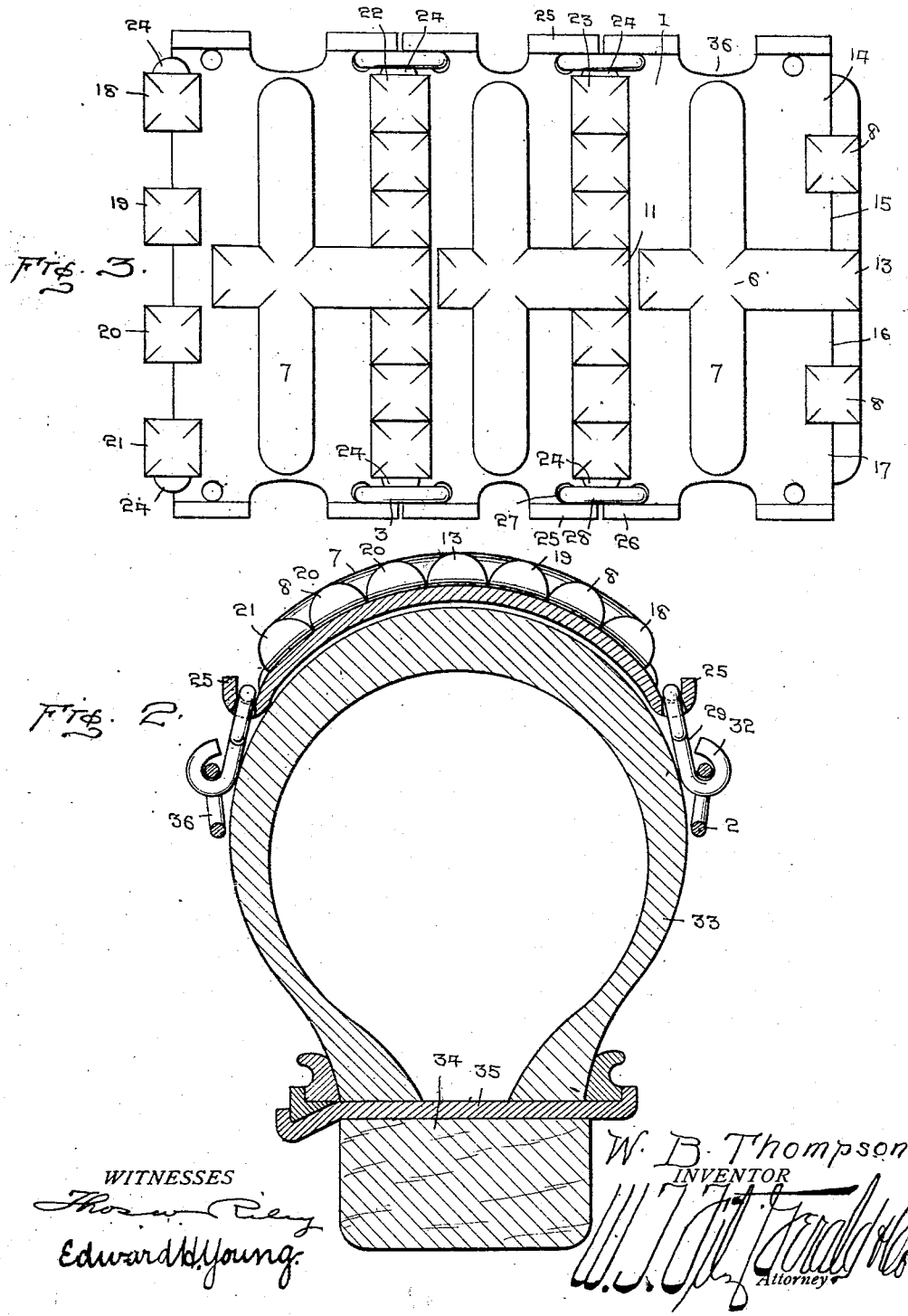
WITNESSES
INVENTOR
W. B. Thompson

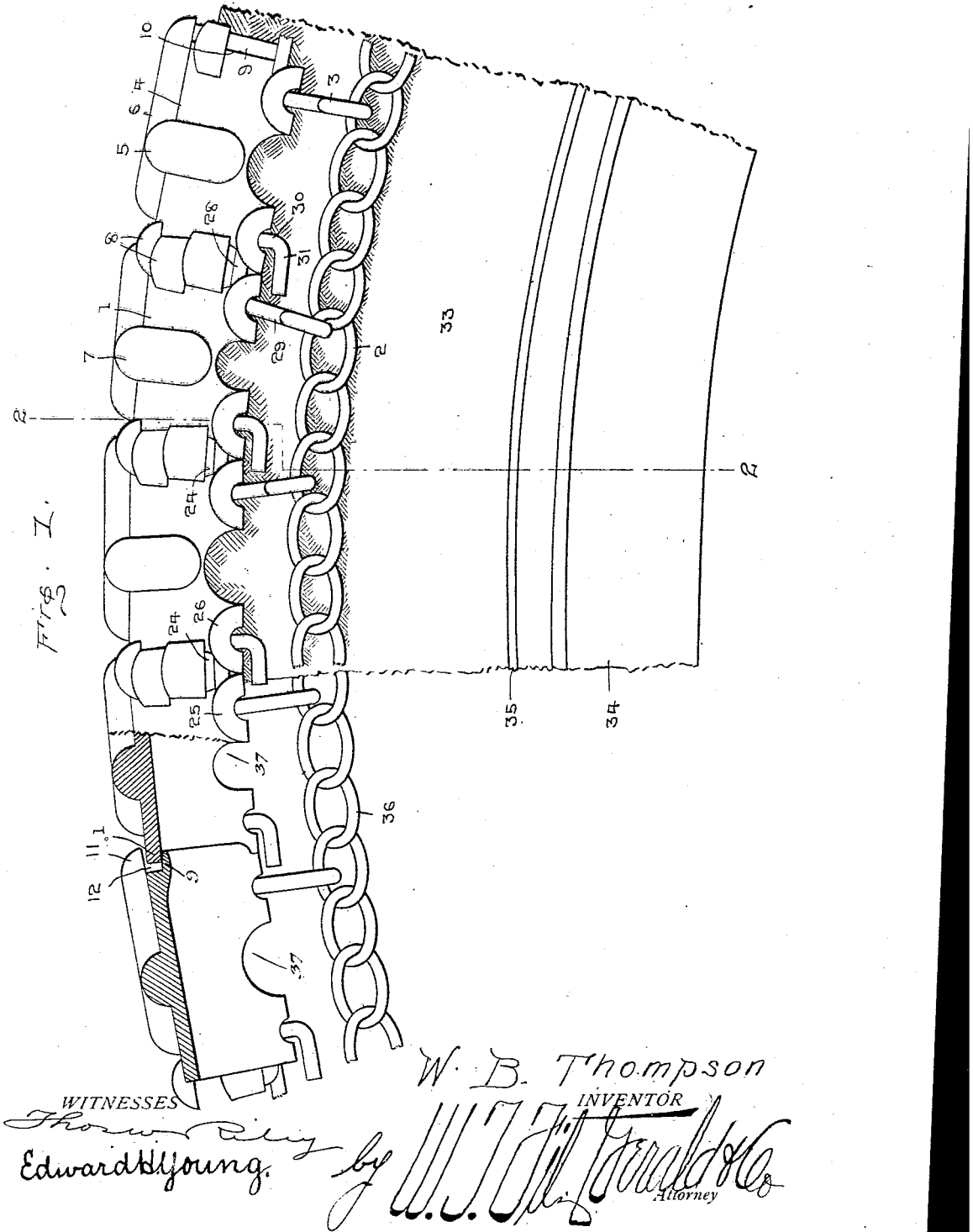

UNITED STATES PATENT OFFICE.

WILLIAM B. THOMPSON, OF LOS GATOS, CALIFORNIA.

COMBINED TIRE PROTECTOR AND GUARD.

1,145,394.

Specification of Letters Patent. Patented July 6, 1915.

Application filed July 11, 1914. Serial No. 850,459.

*To all whom it may concern:*

Be it known that I, WILLIAM B. THOMPSON, a citizen of the United States, residing at Los Gatos, in the county of Santa Clara and State of California, have invented certain new and useful Improvements in Combined Tire Protectors and Guards; and I do hereby declare the following to be a full, clear, and exact description of the invention, such as will enable others skilled in the art to which it appertains to make and use the same.

My invention relates to combined tire protectors and guards.

The main object in my invention is to give a device that will thoroughly protect and guard the tire and yet allow of full freedom of flexibility.

One object of my invention is to give a device that will allow of a tire protection composed of sections of interlocking parts to give a dust proof joint therebetween.

Another object of my invention is to connect with my tire protector the guard to said tire which will at the same time assist in the retention of a protector to the tire.

Still another object of my invention is to give a device that will connect the protector sections and the guard without in any way interfering with the operation of either.

With these and other objects in view to be developed as I proceed, I shall now develop my invention in which, similar characters of reference refer to similar parts in the drawings in which, a preferred embodiment of my invention is shown, but I do not desire to be limited to the form or structure shown and illustrated other than what would fall within the scope of the claims appended hereto.

In the drawings Figure 1 represents a longitudinal elevational view of my device partly in section as applied to a pneumatic tire of an automobile. Fig. 2 is a vertical section of a tire and protector on the line 2—2 in Fig. 1. Fig. 3 a plan view of several sections of my protector interlocked and linked together, as they would appear on a tire to show all spaces between sections closed to make an impenetrable armored tread surface.

In Fig. 1 of the drawings, 1 is a section entering into the structure of my tire protector to protect the tread surfaces of the tire, 2 is my chain guard to guard the sides of my tire from scraping or chafing, 3 the links of specific construction which are used to unite the sections of my protector and to connect my protector with my guard device.

My sections 1 are composed of a body portion 4 and ribs 5, said ribs comprising a main longitudinal rib 6, transverse ribs 7 and interlocking ribs or lugs 8. Extended from one end of my sections I have on the inside surface thereof, an underlying lip or interlocking tongue 9, which tongue extends outward from the end 10 of my section and my interlocking lugs 8 overlie the edge as at 11, thereby forming a curved recess 12 to seat the opposite end of the section 1, as plainly shown in the sectional view of Fig. 1.

My interlocking operation is achieved by having my longitudinal rib 6 overlie my section on the edge containing the inside lip 9 as at 13 in Fig. 3 of the drawings, and on each side therein and in spaced relationship thereto I place my interlocking lugs 8. My central lug 6 runs short of the opposite edge of my section 1 thereby allowing the end 13 of the neighboring section to seat over the surfaces of the section 1 as shown at 11 in the sectional view of Fig. 1. In Fig. 3 interlocking lugs 8 extend over and intermesh between the central rib 6 and the lugs 8 seating at the points marked 14, 15, 16 and 17 of Fig. 3, and the lugs that would fit in here correspond in position to the lugs 8 as marked 18, 19, 20 and 21 of Fig. 3, thereby forming when said lugs are interlocked and complete a transverse rib, such as numbered 22 and 23 of Fig. 3 of the drawings. This interlocking arrangement gives a dust proof space that closes automatically that will prevent lateral play or displacement, and yet allow flexibility in the longitudinal movement of the sections of the tire protector on the tire, the longitudinal movement thereof tending to scrape dust or grit from out of the joint, and to further guard this sectional joint as at 12 in Fig. 1, I provide side lips 24, these lips being positioned between the end lug and the flange of the section to be hereinafter described.

I strike up each side portion of my section near the abutting edge thereof as at 25 and 26, thereby forming an approximate groove between said flange 25 and 26 and the tongue 24 previously described, and about midway of said groove I strike an aperture 27. Through these apertures thus formed, I insert my connecting and supporting link 3, This connecting and supporting link 3 is composed of the horizontal section 28 and the body portion 29, a downturned section 30 and backturned section 31 as plainly shown in Fig. 1 of the drawings. This section of my connecting link I run through the apertures 27 thereby connecting the sections 1 of my protector into locked position, the section 28 lying upon the upper surfaces of the section and protected by means of the upturned flanges 25 and 26. At the lower end of my body section 29 I strike a hook 32 which is looped through a link of my guard chain thereby connecting my guard chains to my protective device. This arrangement allows sufficient longitudinal play upon the tire 33 which is mounted upon the felly 34 by means of any suitable fastening device 35, to cause great flexibility in my protector, and said arrangement will retain my devices in operative position. I also cut recesses 27 in the longitudinal edges of my sections adjacent the central cross rib 7 to allow ventilation to the tire when same becomes heated by rapid use.

To demount my combined tire protector and guard, I cut one of the links 36 of my guard 2 and one of the connecting links 3 on each side of my device at opposite points which separates the same and allows it to be removed.

What I claim as new and desire to secure by Letters Patent is:—

1. A combined tire protector and guard comprising a plurality of interlocking sections, each of said sections having transverse and longitudinal ribs thereon; a plurality of lugs thereon, two of said lugs and the longitudinal rib projecting beyond one transverse edge of a section, the longitudinal rib being cut away at the opposite edge of said section; a projecting lip on the under side of the first mentioned edge thereby forming a curved recess; a plurality of projecting lugs upon the edge opposite the said lip adapted to interlock with the first mentioned lugs of the next succeeding section; a plurality of links connecting said interlocking sections, and guard devices connected to said links.

2. A combined tire protector and guard comprising a plurality of sections each section comprising a body portion: an underlying inside lip extending beyond one transverse edge of said body portion: a longitudinal rib extending beyond said edge and above said lip: projecting lugs spaced from said longitudinal rib, extending beyond said edge and above said lip: projecting lugs on the opposite edge of said section in spaced relation to each other adapted to interlock with the first mentioned lugs of the next succeeding body portion: flange members on each side of said body portion: apertures in the sides of said sections near the said transverse edges adjacent the said flanges: side lips upon the sides of the lugs adjacent said apertures, and connecting links inserted in said apertures to connect said sections.

3. A combined tire protector and guard device for automobiles comprising a plurality of sections to said protector: a plurality of projecting spaced lugs at both transverse edges of each section, the said lugs intermeshing between the lugs of an abutting section: a projecting lip beneath one of said edges: a longitudinal rib to said section, one end of the said rib projecting above said lip, the opposite end thereof being positioned a distance from the opposite edge equal to the said projection: links connecting said sections together, and guard devices connected to said links, said guard devices comprising a plurality of enchained links.

In testimony whereof I have signed my name to this specification in the presence of two subscribing witnesses.

WILLIAM B. THOMPSON.

Witnesses:
C. C. COOK,
GEO. A. MCGOWAN.